Oct. 4, 1949.　　　　　F. C. FISHER　　　　　2,483,895
ELECTROMAGNETIC STRAIGHT-LINE MOTOR
Filed April 19, 1947　　　　　　　　　　4 Sheets-Sheet 1

INVENTOR.
FREDERICK C. FISHER
BY Edwin Levisohn
ATTORNEY

Oct. 4, 1949.    F. C. FISHER    2,483,895
ELECTROMAGNETIC STRAIGHT-LINE MOTOR
Filed April 19, 1947    4 Sheets-Sheet 2
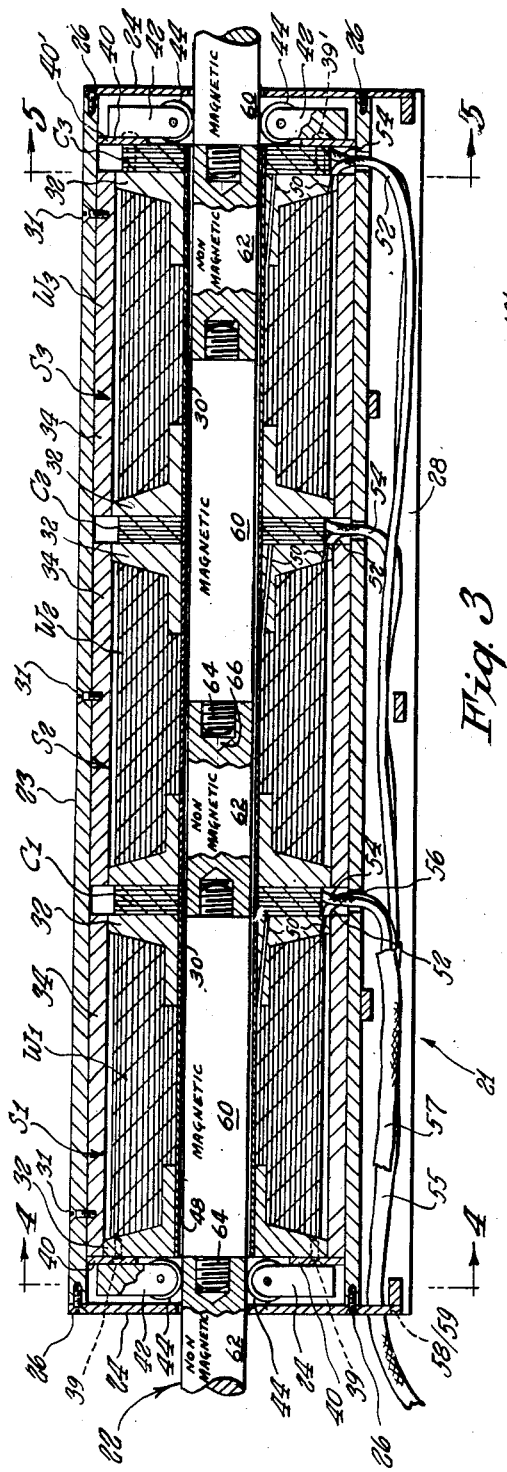
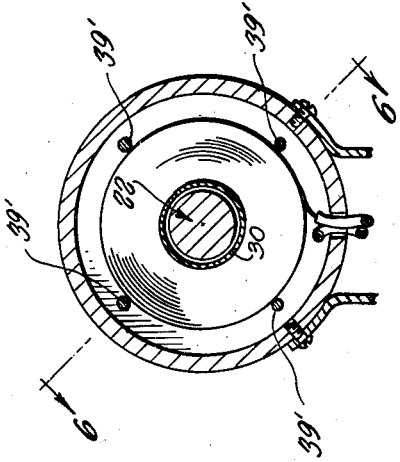
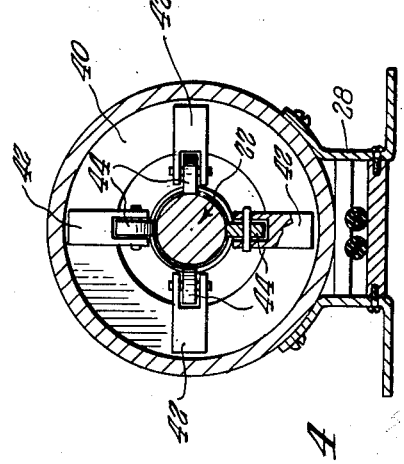
INVENTOR.
FREDERICK C. FISHER
BY Edwin Lenscher
ATTORNEY

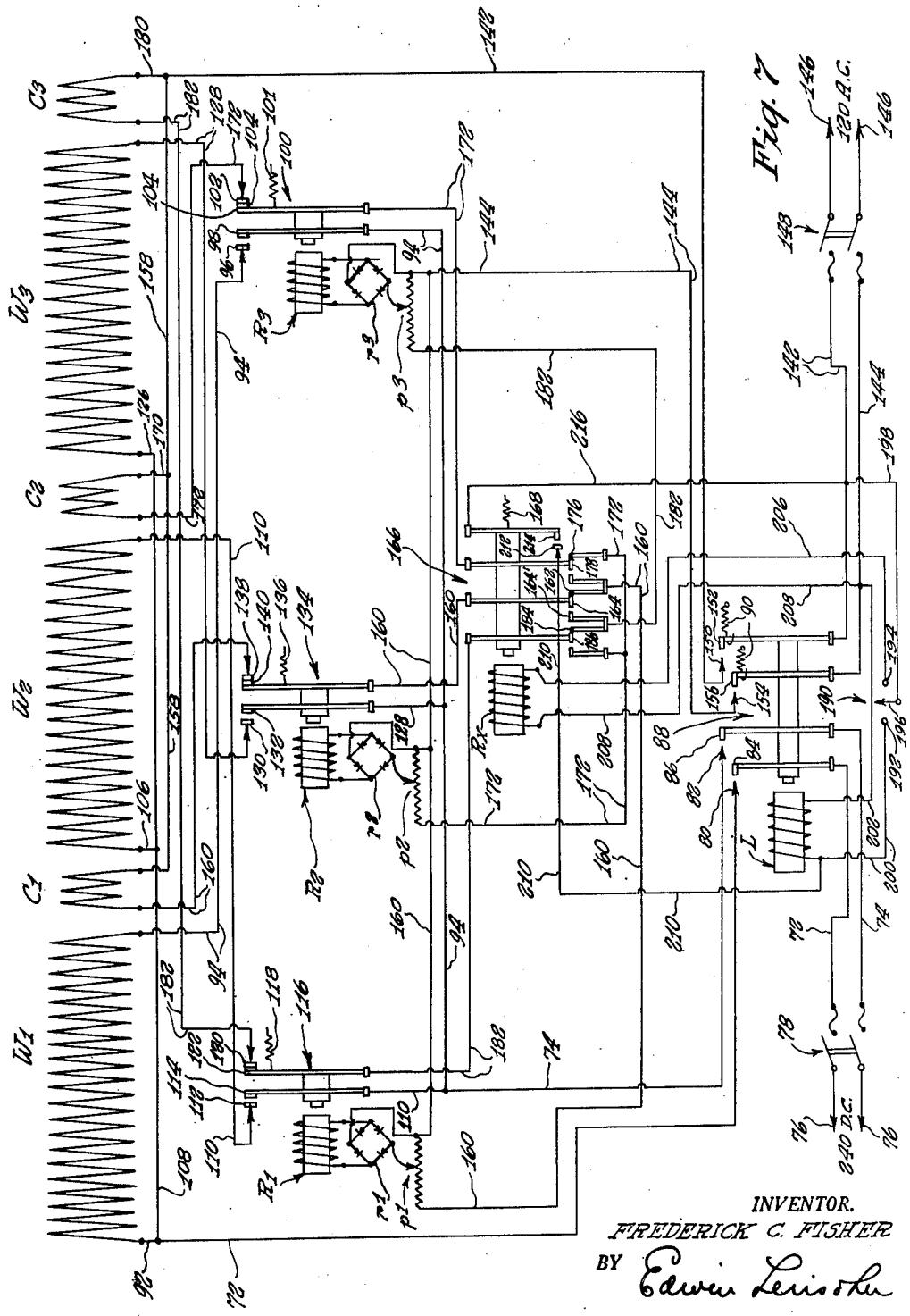

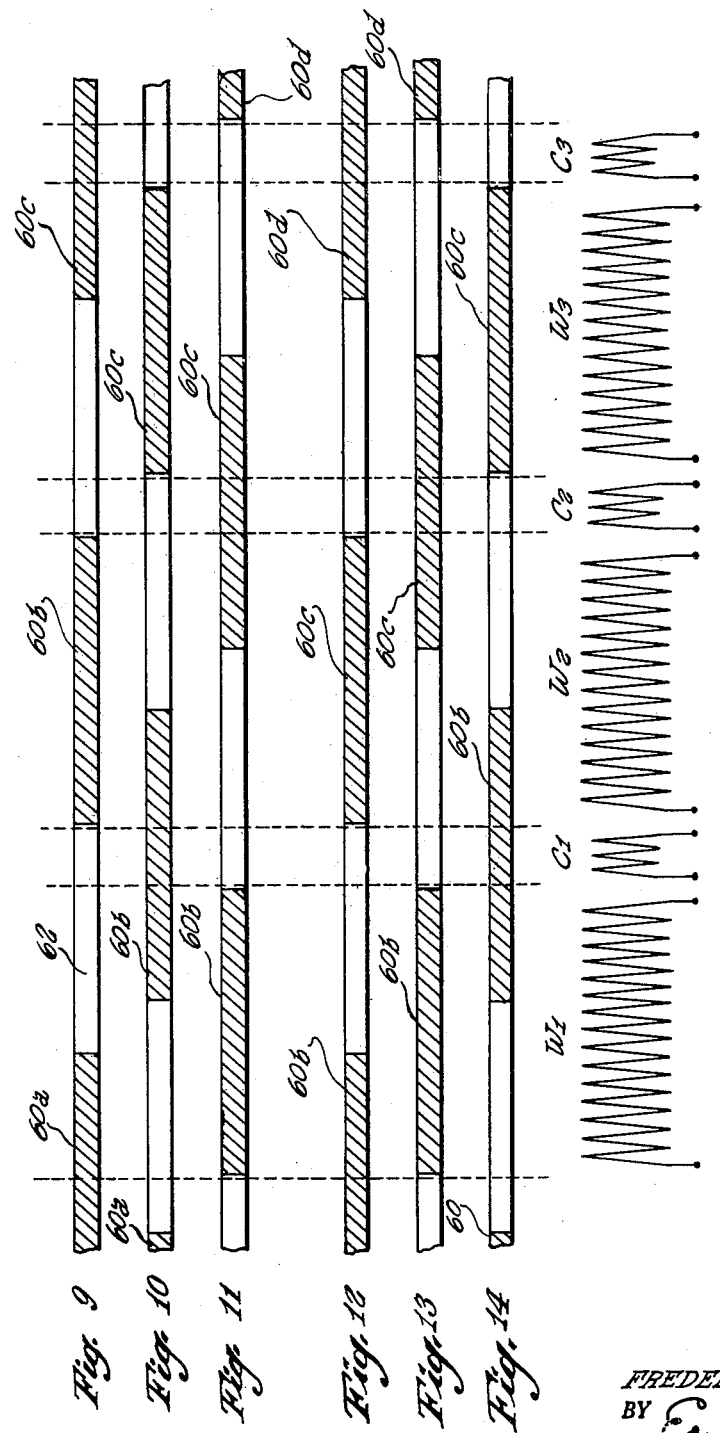

Patented Oct. 4, 1949

2,483,895

UNITED STATES PATENT OFFICE 2,483,895

ELECTROMAGNETIC STRAIGHT-LINE MOTOR

Frederick C. Fisher, Bellmore, N. Y., assignor to Electronoid Corporation, New York, N. Y., a corporation Application April 19, 1947, Serial No. 742,622

8 Claims. (Cl. 172—290)

1

This invention relates to an electromagnetic straight-line motor which, while useful for other purposes, is intended primarily for operating the doors of elevators, or the like.

The electromagnetic straight-line motor of the present invention is, in general, of the type described in my prior patent, No. 2,365,632, dated December 19, 1944, which comprises two relatively movable units of which one is a power unit provided with a series of tandem-arranged solenoid windings, and the other unit is an articulated solenoid plunger extending through these windings. The solenoid windings are energized in a certain sequence by means which are controlled by the relative movement between the units and operate in such a manner as to dispense with individual switch-operating mechanisms for the several solenoid windings. More particularly, the solenoid windings are connected to, and disconnected from, a source of electric power under the control of relays which are, in turn, controlled by current-varying choke coils, whereby to produce a relative movement between the units which is smooth and continuous through a range required for actuating the device operated thereby.

It is the primary aim and object of the present invention to adapt the solenoids of the present electromagnetic straight-line motor for operation with D. C. current in order to attain, in comparison to their operation with A. C. current in my prior motor, quicker and more economical operation of the present motor, and also permit construction of the same of lighter weight.

It is another object of the present invention to rectify the A. C. current supplied by the choke coils to the control relays, so that the latter may be of the D. C. type that operate more quietly and positively than A. C. relays.

The above and other objects, features and advantages of the present invention will be more fully understood from the following description considered in connection with the accompanying illustrative drawings.

In the drawings:

Fig. 1 is a perspective view of an electromagnetic straight-line motor embodying the present invention;

Fig. 2 perspectively illustrates a support for the motor;

Fig. 3 is a longitudinal section through the motor as taken on the line 3—3 of Fig. 1;

Figs. 4 and 5 are cross-sections through the motor taken substantially on the lines 4—4 and 5—5, respectively, of Fig. 3;

2

Fig. 7 is a wiring diagram of the motor;

Fig. 8 diagrammatically illustrates the tandem-arranged solenoid windings and associated choke coils of the motor; and Figs. 9 to 14, inclusive, diagrammatically illustrate different operating positions of the solenoid plunger of the motor relative to the solenoid windings shown in Fig. 8.

Figure 1:
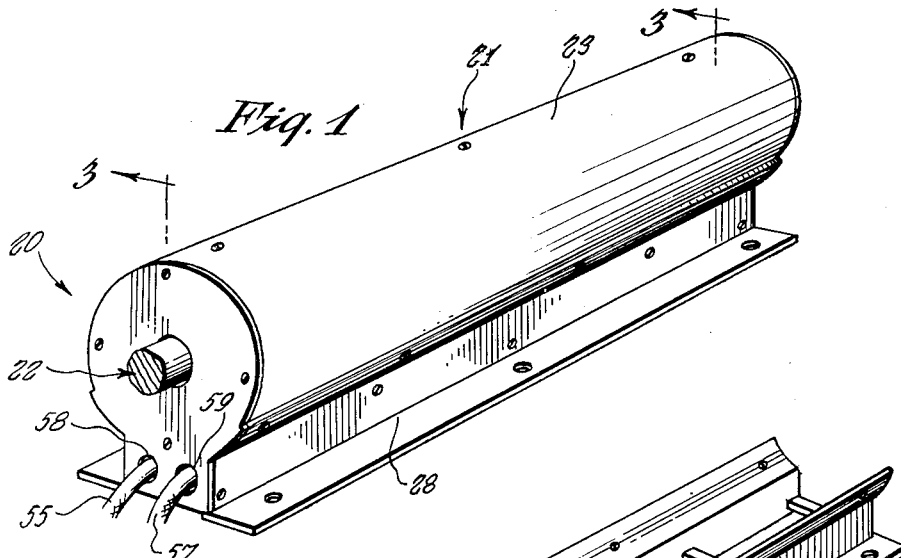
Figure 2:
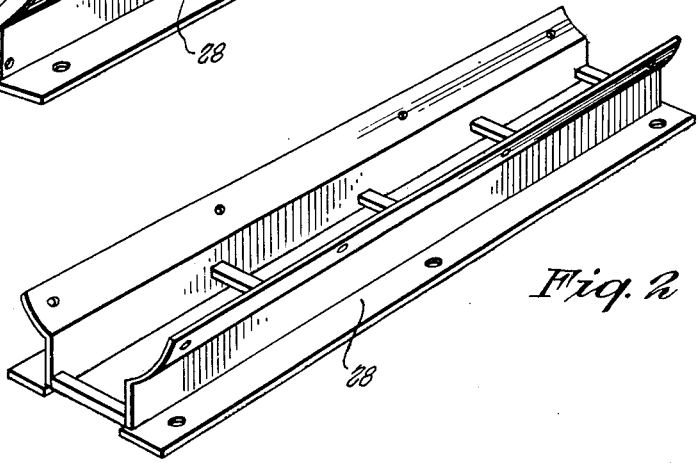
Figure 6:
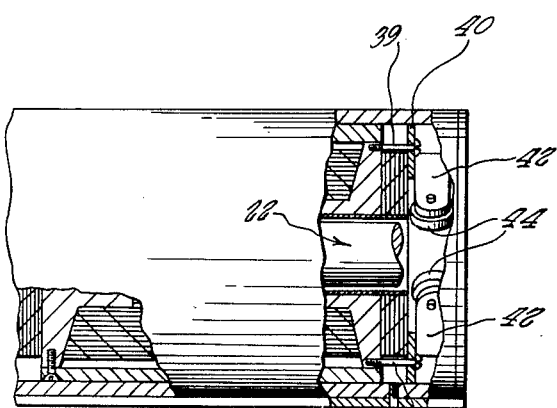
Fig. 6 is a fragmentary elevational view, partly in section of the motor.

Referring to the drawings, and more particularly to Figs. 1 to 6 thereof, the reference numeral 20 designates an electromagnetic straight-line motor which comprises a power unit 21 and an articulated solenoid plunger 22. The power unit 21 comprises a cylindrical shell or casing 23 of any suitable non-magnetic material, in which solenoids S1, S2 and S3 are housed. The open ends of the casing 23 are normally closed by cover members 24 which may be screwed in place as at 26 (Fig. 3). The casing 23 is carried by a base 28 (see also Fig. 2), which facilitates the mounting of the power unit 21. Each of the solenoids S1, S2 and S3 comprises a tubular member 30, two spaced end members 32 which fit over the tubular member 30, and a cylindrical shell 34 which fits over the end members 32 and into the casing 23 in the manner shown in Fig. 3. The tubular member 30 and end members 32 of each solenoid form a bobbin for the reception of the solenoid winding W. Each of the solenoids S1, S2 and S3 is secured to the casing 23 by a screw 31. It appears from Fig. 3 that the tubular member 30 of each solenoid extends beyond one end thereof for the reception of a preferably form-wound choke coil C. Thus, the choke coils C1 and C2 are interposed between the solenoids S1, S2 and S2, S3, respectively, while coil C3 is placed at the free end of solenoid S3. The solenoids S1 to S3 and associated choke coils C1 to C3 are arranged in the casing 23 in the end-to-end relation shown. Secured by screws 39 to the outermost end members 32 of the solenoids S1 and S3 are discs 40 (Figs. 3 and 6) which carry quadrangularly arranged brackets 42 in which are journaled rollers 44 that serve as anti-friction bearings for the cylindrical solenoid plunger 22. The screws 39' (Figs. 3 and 5) serve also to draw disc 40' into firm engagement with the adjacent choke coil C3. Plunger 22, which extends through the tubular members 30 of the solenoids S1 to S3, is of slightly smaller diameter than the internal diameter of these tubular members, and the bearing rollers 44 position the plunger 22 so that the same is spaced from the tubular members 30 by a uniform cylindrical gap 48.

As hereinafter explained more in detail, the solenoid plunger 22 consists of longitudinal sections which are alternately magnetic and non-magnetic. The end members 32 and the shell 34 of each solenoid S are made of any suitable magnetic material, such as cold-rolled steel, in order to form, together with an associated magnetic section of the solenoid plunger 22, a substantially closed magnetic field. As described more in detail hereinafter, the magnetic and non-magnetic sections of the plunger are so coordinated that, on energization of the solenoids in a predetermined sequence, the magnetic sections are successively drawn into their respective solenoids to effect linear movement of the plunger in one direction. Conversely, on energization of the solenoids in the reverse sequence, the magnetic sections are successively drawn into their respective solenoids to effect linear movement of the plunger in the opposite direction.

One of the end members 32 of each solenoid S is provided with holes 50 through which the leads 52 of the associated windings W are passed to the outside of the solenoid, from where they are led, together with the leads 54 of the adjacent choke coil C, through an aperture 56 in the casing 23 and into the base 28 of the power unit in the manner shown in Fig. 3. The leads 52 and 54 of the several solenoid windings W and choke coils C are then led, preferably gathered in the form of cords 55 and 57, through holes 58 and 59, respectively, in one of the end covers 24 of the power unit for the connection of these leads in their respective circuits which are described hereinafter.

As previously mentioned, the solenoid plunger 22 comprises alternate sections 60 and 62 which are made from suitable magnetic and non-magnetic materials, respectively. Thus, the magnetic sections 60 may be of cold-rolled steel, while the non-magnetic section 62 may be made of stainless steel. In the present instance, the magnetic sections 60 are provided at their opposite ends with threaded shanks 64 which are received in threaded bores 66 in the ends of the adjacent non-magnetic sections 62 in order to hold all sections 60 and 62 in the end-to-end relation shown in Fig. 3 and combine them into a single cylindrical plunger of uniform diameter throughout.

If the present motor is applied to the operation of an elevator door, for instance, the power unit 21 may, as in the case of my prior motor, be carried by the elevator door so as to be movable with the same, while the solenoid plunger 22 may be fixedly mounted on the elevator in such relation to the door thereof that the power unit may ride on the plunger when the door is opened or closed. It is, of course, understood that the present motor may be applied for operating any device other than an elevator door, and that the power unit 21 may be held stationary and the plunger permitted to move and operate a device.

Reference is now had to the wiring diagram in Fig. 7, which shows the operating and control circuits for the solenoid windings W and associated choke coils C. The several solenoid windings W are connected in parallel across leads 72 and 74 which may be connected with a D. C. supply line 76 by means of a line switch 78. Interposed in the leads 72 and 74 are the contacts 80, 84 and 82, 86, respectively, of a 4-pole single-throw switch 88 which is normally urged by a spring 90 into the open position shown, and which is closed on energization of a line relay L. One end of solenoid winding W1 is connected with lead 72 by a lead 92, and the other end of this solenoid winding is connected with lead 74 through a lead 94 in which are interposed the associated contacts 96, 98 of a double-pole, double-throw switch 100 which is normally urged by a spring 101 into the position shown, in which the other associated contacts 102 and 104 of said switch are closed. Switch 100 is thrown into its other position on energization of an associated control relay R3.

One end of the solenoid winding W2 is connected with lead 72 through leads 106 and 108, while the other end of this winding is connected with lead 74 through a lead 110 in which are interposed the associated contacts 112, 114 of a double-pole, double-throw switch 116 which, like switch 100, is normally urged by a spring 118 into the one position shown, in which its other associated contacts 120, 122 are in engagement with each other. Switch 116 is thrown into its other position on energization of an associated control relay R1.

One end of solenoid winding W3 is connected with the lead 72 through leads 126 and 108, while the other end of this winding is connected with lead 74 through leads 128 and 94. Interposed in the lead 128 are one pair of associated contacts 130 and 132 of a double-pole, double-throw switch 134 which is normally urged by a spring 136 into the position shown, in which its other pair of associated contacts 138 and 140 are engaged. Switch 134 is thrown into its other position on energization of an associated control relay R2. It thus follows that, when the D. C. line switch 78 is closed, either one of the solenoid windings W1, W2 or W3 may be energized on energizing the control relay R of its associated switch 100, 116 or 134, respectively.

The choke coils C are connected in parallel across leads 142 and 144 which may be connected with an A. C. supply line 146 by a line switch 148. Interposed in the lead 142 is another pair of associated contacts 150 and 152 of the switch 88, and interposed in the lead 144 is still another pair of associated contacts 154 and 156 of the same switch 88.

One end of the choke coil C1 is connected with lead 142 through a lead 158, while the other end of this coil is connected with lead 144 through a lead 160. Interposed in the lead 160 are the normally closed contacts 138, 140 of switch 134, and the associated contacts 162, 164 of a triple-pole, double-throw switch 166 which is normally urged by a spring 168 into the one position shown, and is shifted to its other position on energization of an associated "reversing" relay Rx. Further interposed in the lead 160 is the control relay R1, across the winding of which is connected a rectifier r1, preferably of the dry-disc type. Also connected across the input of the rectifier r1 is a potentiometer p1.

One end of the choke coil C2 is connected with lead 142 through leads 170 and 158, while the other end of the coil is connected with lead 144 through leads 172 and 160. Interposed in lead 172 are the normally engaged contacts 102, 104 of switch 100, as well as another pair of associated contacts 176, 178 of switch 166. Further interposed in lead 172 is the control relay R2, across the winding of which is connected a rectifier r2 which, like the rectifier r1, is also of the dry disc type. Connected across the input of rectifier r2 is a potentiometer p2.

One end of the choke coil C3 is connected with lead 142 through a lead 180, while the other end of this coil is connected with lead 144 through a lead 182, in which are interposed the normally closed contact 120, 122 of switch 116, as well as another pair of associated contacts 184, 186 of switch 166. Further interposed in lead 182 is the control relay R3, across the winding of which is connected a rectifier r3 that may be of the same type as the rectifiers r1 and r2. Connected across the input of the rectifier r3 is a potentiometer p3.

The operation of the instant straight-line motor is under the control of a main switch 190, having fixed contacts 192 and 194 and a movable contact 196 engageable with either fixed contact. More particularly, the straight-line motor 20 is set for relative movement in one direction between the power unit 21 and the solenoid plunger 22, on closing the main switch 190 by way of the contacts 192 and 196. On thus closing the main switch 190, after first closing the A. C. line switch 148, the line relay L is energized by way of leads 142 and 198, contacts 192, 196 of main switch 190, and leads 200, 202 and 144. Energization of the line relay L results in closure of the normally open switch 88 and, hence, in the connection of the described solenoid winding and choke coil circuits with the D. C. and A. C. power lines 76 and 146, respectively, assuming thereby that D. C. line switch 78 has also been previously closed. In the above-described closed position of the main switch 190, the reversing relay Rx is de-energized and the associated switch 166 assumes the normal position shown in the wiring diagram. For causing reverse operation of the instant motor, i. e. relative movement between the power unit 21 and the solenoid plunger 22 in the opposite direction, the main switch 190 is moved to its other closed position, in which contacts 196 and 194 engage each other. Actuation of the main switch 190 into the latter closed position causes interruption of the above described circuit of the line relay L, and closure of the circuit of the reversing relay Rx, which comprises leads 142 and 198, contacts 194, 196 of main switch 190, lead 206, relay Rx, and leads 208 and 144. Closure of the main switch 190 for reverse operation of the motor also causes closure of an alternative circuit of the line relay L, so as to close switch 88 and maintain the solenoid winding and choke coil circuits connected with the D. C. and A. C. power lines 76 and 146, respectively. This alternative circuit of line relay L comprises leads 144 and 202, line relay L, lead 210, an additional pair of associated contacts 212, 214 of switch 166 which is then in the closed position other than that shown, and leads 216 and 142.

For proper and smooth operation of the instant motor, the lengths of the solenoid windings S and choke coils C, and of the magnetic and non-magnetic sections 60 and 62, respectively, of the solenoid plunger 22, bear the approximate relation shown in Fig. 3 and also in Fig. 8. Thus, each of the magnetic sections 60 of the solenoid plunger 22 may be of a length equal to that of a solenoid S, whereas each of the non-magnetic sections 62 of the solenoid plunger may be made half the length of the solenoid S plus one and one-half the length of a choke coil C.

The instant motor operates as follows. Assuming that the line switches 78 and 148 are closed, and that the magnetic sections 60b of the solenoid plunger 22 is at the moment completely within the solenoid winding W2 (Figs. 8 and 9), and further assuming for the sake of simplicity of description that the power unit 21 is fixed and the plunger 22 movable, then the latter will, on closure of the main switch 190 by way of the contacts 192 and 196, move to the left as viewed in Fig. 9 due to the energization of the solenoid winding W3 and the consequent attraction of the magnetic plunger section 60c thereinto (Fig. 10). The energization of solenoid S3 at this time is brought about as follows. It will be noted in the coordinated Figs. 8 and 9 that the magnetic plunger section 60b is outside the choke coil C2, thus lowering the reactance of the latter to a minimum and increasing the current flow therethrough to an extent that the associated control relay R2 is fully energized and the adjacent switch 134 shifted to its other closed position in which the contacts 130 and 132 thereof are engaged, thereby closing the previously described circuit of the solenoid winding W3 (Fig. 7). The energized solenoid winding W3 thus draws the plunger 22 from the position shown in Fig. 9 to the left into the position shown in Fig. 10. While plunger 22 is in the position shown in Fig. 9, choke coil C1 is also not entered by a magnetic plunger section 60, but it will be noted that its circuit is then interrupted at the contacts 138, 140 of switch 134 which, as described above, is then in its other closed position due to the present energization of the control relay R2. Hence, the choke coil C1 is then ineffective. On the other hand, while the plunger 22 is in the position shown in Fig. 9, choke coil C3 is fully entered by the magnetic plunger section 60c and its reactance is then so high that the resultant current flow to the associated control relay R3 is below the pick-up rating of the latter, so that switch 100 will not be affected by it and the circuit of the solenoid winding W1 will remain open.

It will be noted from Figs. 8 and 10 that the magnetic plunger section 60c, when completely drawn into the solenoid winding W3, is completely withdrawn from choke coil C3, thereby lowering the reactance of the latter to a minimum and increasing the current flow therethrough to an extent where the associated control relay R3 is fully energized and causes the coordinated switch 100 to close across its contacts 96 and 98, closing thereby the circuit of the solenoid winding W1. On energization of the solenoid winding W1, the magnetic plunger section 60b is drawn thereinto, thus continuing the motion of the plunger 22 to the left into the position shown in Fig. 11. While the plunger assumes the position shown in Fig. 10, choke coil C1 is entered by the magnetic plunger section 60b, causing minimum inductance and, hence, a current flow to the associated relay R1 which is insufficient to energize the latter above its pick-up point, wherefore the coordinated solenoid winding W2 remains de-energized. Also, the choke coil C2 is, in the position of the plunger shown in Fig. 10, not entered by any magnetic plunger section 60, but it will be noted that its circuit is then interrupted at the contacts 102 and 104 of switch 108 which is then in its other closed position due to the full energization of the control relay R3, wherefore solenoid winding W3 is then also de-energized.

In the position of the plunger 22 shown in Fig. 11, no magnetic section 60 thereof is entered in the choke coil C1, wherefore its reactance is at a minimum and the current flow therethrough increases to a point where its associated control relay R1 is fully energized and closes the adjacent switch 116 by way of the contacts 112 and 114 thereof, resulting in closure of the circuit through the solenoid winding W2. When the solenoid winding W2 is thus energized, plunger 22 is moved to its left-most position shown in Fig. 12 due to the attraction of the magnetic section 60c thereof into the energized winding W2.

Assuming now that reverse movement of the solenoid plunger 22 is desired, the main switch 190 is then shifted into its other closed position in which the contacts 194 and 196 are engaged. This causes energization of the reversing relay Rx, as well as closure of the referred alternative circuit of the line relay L by way of the then closing contacts 212, 214 of switch 166. Thus, on shifting the main switch 190 for reverse operation of the motor, while the solenoid plunger 22 is in the position shown in Fig. 12, the reactance of the choke coil C1 is lowered to a minimum due to the absence therein of a magnetic plunger section 60, resulting in an increased flow of current through this choke coil as well as through control relay R3 with which it is then connected by virtue of the engagement of the movable contact 164 of switch 166 with another fixed contact 164' thereof. Energization of control relay R3 results in closure of the associated switch 100 by way of contacts 96 and 98 and, consequently, in closure of the circuit of the solenoid winding W1. When solenoid winding W1 is thus energized, the magnetic plunger section 60b is drawn thereinto into the position shown in Fig. 13, and the plunger 22 is consequently moved to the right. With the plunger 22 in the position shown in Fig. 12, no magnetic plunger section 60 is entered in the choke coil C2, but the circuit of the latter is interrupted at the then disengaged contacts 102, 104 of switch 100, preventing the closure of the circuit of the associated solenoid winding W2. On the other hand, choke coil C3 is, in the position of the plunger 22 in Fig. 12, entered by the magnetic plunger section 60d, wherefore its reactance is then so high as to prevent closure of the associated solenoid winding W3.

With the plunger 22 in the position shown in Fig. 13, none of the magnetic sections 60 thereof is in the choke coil C3, wherefore its reactance is lowered to a minimum and the current flow therethrough increases to a point where the associated control relay R2 is fully energized to close the coordinated switch 134 across the contacts 130, 132 thereof, and thereby close the circuit of the solenoid winding W3. When the latter winding is thus energized, the magnetic plunger section 60b is drawn into the same, causing thereby continued movement of the plunger 22 to the right from the position shown in Fig. 13 to that shown in Fig. 14.

Continued movement of the plunger 22 to its right-most position takes place in a self-evident manner and requires no further description. Of course, if the instant motor is used for the operation of an elevator door, the power unit 21 is, as previously mentioned, carried by the movable elevator door, while the plunger 22 is mounted on the elevator and constitutes the stationary part of the motor. In this exemplary application of the instant motor to the operation of an elevator door, the main switch 190 is preferably mounted within ready reach of the elevator operator, and the various control instrumentalities for the solenoid windings W and choke coils C are preferably mounted on a panel away from the power unit 21 so as to be readily accessible for repair and check. Due to this separate installation of the various control instrumentalities for the solenoid windings W and choke coils C on a separate panel, the latter may also be placed inconspicuously at most any convenient place and may even be normally hidden from view, and the power unit 21 need contain only the solenoids S and the choke coils C, permitting thereby the simple and condensed construction of the power unit 21 as described and shown in Fig. 3.

The use in the present motor of D. C. solenoids S results, in comparison to the A. C. solenoids used in the motor of my prior patent, not only in quieter and more economical operation due to the absence of the A. C. hum and due to less current consumption for a given pull, but also in the elimination of laminated plunger sections as required for A. C. solenoids. Instead, the D. C. solenoids permit the use of solid magnetic and non-magnetic sections of cylindrical bar stock in the solenoid plunger and their connection by the threaded male and female portions thereof, as described and as shown in Fig. 3. Also, the reduced cross section at both ends of the magnetic plunger sections 60, as represented by the threaded shanks 64, offers an advantage in regard to the magnetic pull, in that the shanks 64 lend to these sections the effect of tapered plungers which tend slightly to increase the stroke of the same.

The choke coils C supply their respective control relays R with A. C. current which varies in relation to the position of the magnetic plunger sections 60 passing through them. It is, of course, necessary to use A. C. current for the choke coils C in order to obtain the desired action. Since it was found, however, that the A. C. control relays used in the motor of my aforesaid prior patent have a tendency to vibrate somewhat as the A. C. voltage approaches the point at which they are set to actuate their associated switches, they were wound for D. C. current, and a rectifier r was connected across the coil of each control relay R. The advantage of the D. C. relays R lies in quieter and more positive operation as compared to A. C. relays.

The potentiometers p (Fig. 7) are adjustable, preferably in unison by having their shafts (not shown) ganged to a single control so that they will all stay in step at any adjustment. If no potentiometers were provided, the speed at which the control relays R would respond to variations in the reactance of their associated choke coils C, as caused by the movement of the magnetic plunger sections relative thereto, while being adequate to accomplish smooth operation of the motor under a certain load, would be too slow, for instance, at a different load on the motor and hence, lag the action of the solenoid plunger. By reason of the provision of the adjustable potentiometers, the resistance may be varied so that the action of all control relays R may be varied to provide smooth action of the motor at any load.

For proper operation of the instant motor, the windings of the control relays R and choke coils C have to be so matched that, when a magnetic plunger section 60 is entered into a choke coil C, the inductive reactance due to the presence of the magnetic plunger section is such that the resultant current flow through the associated control relay C will be below its pick-up rate. However, when the magnetic plunger section is withdrawn from the choke coil, the inductive reactance is lowered sufficiently to allow such a surge in the current that the associated control relay becomes effective.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. In apparatus of the character described, which comprises tandem-arranged solenoid coils and a common solenoid plunger therefor having alternate magnetic and non-magnetic sections, a direct-current relay for each coil operable to control energization of the latter, a winding for each relay, means for connecting said windings to an alternating current source, and means including current-rectifying means for operatively connecting said windings with their respective relays, said windings being in such reactance relation with said plunger as to cause sequential operation of their respective relays on predetermined relative movement between said windings and plunger in consequence of energization of said coils under the control of said relays.

2. In apparatus of the character described, which comprises tandem-arranged solenoid coils and a common solenoid plunger therefor having alternate magnetic and non-magnetic sections, a direct-current relay for each coil operable to control energization of the latter, a winding for each relay, means for connecting said windings to an alternating current source, and means including a rectifier and a potentiometer across the A. C. input of the latter for operatively connecting each winding with its respective relay, said windings being in such reactance relation with said plunger as to cause sequential operation of their respective relays on predetermined relative movement between said windings and plunger in consequence of energization of said coils under the control of said relays.

3. In apparatus of the character described, which comprises tandem-arranged solenoid coils and a common solenoid plunger therefor having alternate magnetic and non-magnetic sections, a direct-current relay for each coil operable to control energization of the latter, a winding for each relay, means for connecting said windings to an alternating current source, and means including current-rectifying means for operatively connecting said windings with their respective relays, said windings being arranged in alternation with said coils and in such reactance relation with said plunger as to cause sequential operation of their respective relays on predetermined relative movement between said windings and plunger in consequence of energization of said coils under the control of said relays.

4. In apparatus of the character described, the combination of tandem-arranged direct-current solenoid coils, a common solenoid plunger therefor having alternate magnetic and non-magnetic sections, a direct-current relay for each coil operable to control energization of the latter, a winding for each relay, means for connecting said windings to an alternating current source, and means including current-rectifying means for operatively connecting said windings with their respective relays, said windings being in such reactance relation with said plunger as to cause sequential operation of their respective relays on predetermined relative movement between said windings and plunger in consequence of energization of said coils under the control of said relays.

5. In apparatus of the character described, the combination of tandem-arranged direct-current coils, a common solenoid plunger therefor having alternate magnetic and non-magnetic sections, a direct-current relay for each coil operable to control energization of the latter, a winding for each relay, means for connecting said windings to an alternating current source, and means including current-rectifying means for operatively connecting said windings with their respective relays, said windings being arranged in alternation with said coils and in such reactance relation with said plunger as to cause sequential operation of their respective relays on predetermined relative movement between said windings and plunger in consequence of energization of said coils under the control of said relays.

6. In apparatus of the character described, axially aligned solenoid coils, and a common solenoid plunger therefor mounted for relative movement axially of said coils and comprising alternate magnetic and non-magnetic sections joined to each other in overlapping end-to-end relation.

7. In apparatus of the character described, axially aligned direct-current solenoid windings, and a common solenoid plunger therefor mounted for relative movement axially of said coils and comprising alternate magnetic and non-magnetic sections formed of solid bar stock and joined to each other in overlapping end-to-end relation.

8. In apparatus of the character described, axially aligned direct-current solenoid windings, and a common solenoid plunger therefor mounted for relative movement axially of said coils and comprising alternate magnetic and non-magnetic sections of solid bar stock joined to each other in end-to-end relation by screw-threaded engagement with each other.

FREDERICK C. FISHER.

REFERENCES CITED

The following references are of record in the file of this patent:

UNITED STATES PATENTS

| Number | Name | Date |
| --- | --- | --- |
| 1,640,335 | Grondake | Aug. 23, 1927 |
| 2,365,632 | Fisher | Dec. 19, 1944 |